(12) United States Patent
Connell et al.

(10) Patent No.: US 8,265,342 B2
(45) Date of Patent: Sep. 11, 2012

(54) REAL-TIME ANNOTATION OF IMAGES IN A HUMAN ASSISTIVE ENVIRONMENT

(75) Inventors: Jonathan Connell, Cortlandt-Manor, NY (US); Norman Haas, Mount Kisco, NY (US); Arun Hampapur, Norwalk, CT (US); Ying Li, Mohegan Lake, NY (US); Robert S. Olyha, Jr., LaGrange, NY (US); Sharathchandra Pankanti, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 738 days.

(21) Appl. No.: 12/428,586

(22) Filed: Apr. 23, 2009

(65) Prior Publication Data

US 2010/0272349 A1    Oct. 28, 2010

(51) Int. Cl.
*G06K 9/00*    (2006.01)
*G08G 1/01*    (2006.01)

(52) U.S. Cl. ........................................ 382/104; 340/933

(58) Field of Classification Search ................. 382/103, 382/104, 107; 348/149, 154, 155, 164, 169; 340/425.5, 933, 937, 417, 441, 436, 466, 340/910, 917, 960, 978; 701/20, 74, 79, 701/93, 96, 110, 119, 121
See application file for complete search history.

(56) References Cited

U.S. PATENT DOCUMENTS

| | | | |
|---|---|---|---|
| 5,131,848 A * | 7/1992 | Adams | 434/69 |
| 6,411,328 B1 * | 6/2002 | Franke et al. | 348/149 |
| 7,248,149 B2 * | 7/2007 | Bachelder et al. | 340/425.5 |
| 7,812,711 B2 * | 10/2010 | Brown et al. | 340/426.18 |
| 2005/0105776 A1 | 5/2005 | Lue et al. | |
| 2007/0105069 A1 | 5/2007 | Yamagishi | |

OTHER PUBLICATIONS

Muller, et al., "CACAMO—Computer Aided Camouflage Assessment of Moving Objects," Proceedings of the SPIE—The International Society for Optical Engineering, vol. 6941, p. 69410V-1-12, Apr. 3, 2008.

Khan, et al., "Consistent Labeling of Tracked Objects in Multiple Cameras with Overlapping Fields of View, "IEEE Transactions on Pattern Analysis and Machine Intelligence, vol. 25, No. 10, pp. 1355-1360, Oct. 2003.

Broggi, et al., "Real-Time Image Processing for the Autonomous Driving of a Snowcat in Antarctica," Proceedings of the SPIE—The International Society for Optica Engineering; vol. 4303, p. 138-47, 2001.

(Continued)

*Primary Examiner* — Abolfazl Tabatabai
(74) *Attorney, Agent, or Firm* — Jose Gutman; Fleit Gibbons Gutman Bongini & Bianco PL

(57) ABSTRACT

A method, information processing system, and computer program storage product annotate video images associated with an environmental situation based on detected actions of a human interacting with the environmental situation. A set of real-time video images are received that are captured by at least one video camera associated with an environment presenting one or more environmental situations to a human. One or more user actions made by the human that is associated with the set of real-time video images with respect to the environmental situation are monitored. A determination is made, based on the monitoring, that the human driver has one of performed and failed to perform at least one action associated with one or more images of the set of real-time video images. The one or more images of the set of real-time video images are annotated with a set of annotations.

18 Claims, 5 Drawing Sheets

OTHER PUBLICATIONS

Zhou, et al., "Autonomous Visual Self-Localization in Completely Unknown Environment using Evolving Fuzzy Rule-Based Classifier," 2007 IEEE Symposium on Computational Intelligence in Security and Defense Applications (IEEE Cat. No. 07EX1566), CISDA 2007.

Stokey, R.P., "Software Design Techniques for the Man Machine Interface to a Complex Underwater Vehicle," Oceanic Eng. Soc. IEEE; Soc. Electr. Electron. France; Communaute Urbaine de Brest, Proceedings of Oceans'94, vol. 2, p. 11/119-24, vol. 2, 1994.

Okuma, et al., "Automatic Acquisition of Motion Trajectories: Tracking Hockey Players," Proceedings of the SPIE, vo. 5304, No. 1, p. 202-13, 2003.

"System and Method to Enrich Images with Semantic Data," IBM, IPCOM000156659D, Jul. 30, 2007.

Anonymous Blogger (Nintendo-Mod), Wii Fit Versus Your Shape, Dec. 28, 2009, http://www.nintendowiifitconsole.co.uk/?tag=your-shape-wii-game.

* cited by examiner

| | Annotation ID | Action | Image Set ID | |
|---|---|---|---|---|
| 304 | An_1 | Turned off high-beams | Im_A — 310 | |
| 306 | An_2 | N/A | Im_B — 312 | |
| | | | | |
| 308 | An_N | Turned off high-beams | Im_N — 314 | |

REAL-TIME ANNOTATION OF IMAGES IN A HUMAN ASSISTIVE ENVIRONMENT

FIELD OF THE INVENTION

The present invention generally relates to human assistive environments, and more particularly relates to real-time annotation of images based on a human user's interactive response to an external stimulus in a human assistive environment.

BACKGROUND OF THE INVENTION

Human assistive environments such as those found in the automobile and gaming industries are becoming increasingly popular. For example, many automobile manufacturers are offering human assistive products in many of their automobiles. These products assist a user in controlling the speed of the car, staying within a lane, changing lanes, and the like. Although these products are useful, the training of the human assistive environment is laborious and cost intensive.

SUMMARY OF THE INVENTION

In one embodiment, a method, with an information processing system, for annotating video images associated with an environmental situation based on detected actions of a human interacting with the environmental situation is disclosed. A set of real-time video images that are captured by at least one video camera associated with an environment presenting one or more environmental situations to a human are received. One or more user actions made by the human that is associated with the set of real-time video images with respect to the environmental situation are monitored. A determination is made, based on the monitoring, that the human driver has one of performed and failed to perform at least one action associated with one or more images of the set of real-time video images. The one or more images of the set of real-time video images are annotated with a set of annotations based on the at least one action that has been one of performed and failed to be performed by the human.

In another embodiment, an information processing system for annotating video images associated with an environment of a moving vehicle, based on detected human actions of a driver of the moving vehicle is disclosed. The information processing system includes a memory and a processor communicatively coupled to the memory. An environment manager is communicatively coupled to the memory and the processor. The environment manager is adapted to receive a set of real-time video images captured by at least one video camera associated with an environment of a moving vehicle. The set of real-time video images are associated specifically with at least one vehicle control and maneuver environmental situation of the moving vehicle. One or more user control input signals are monitored. The one or more user control input signals correspond to one or more vehicle control and maneuver actions made by a human driver of the moving vehicle that is associated with the set of real-time video images with respect to the vehicle control and maneuver environmental situation. A determination is made based on the monitoring that the human driver has performed at least one vehicle control and maneuver action associated with one or more images of the set of real-time video images. The one or more images of the set of real-time video images are annotated with a set of annotations based on the at least one vehicle control and maneuver action performed by the human driver.

In yet another embodiment, a computer program storage product for annotating video images associated with an environment of a moving vehicle, based on detected human actions of a driver of the moving vehicle is disclosed. The computer program storage product comprises instructions for receiving a set of real-time video images captured by at least one video camera associated with an environment of a moving vehicle. The set of real-time video images are associated specifically with at least one vehicle control and maneuver environmental situation of the moving vehicle. One or more user control input signals are monitored. The one or more user control input signals correspond to one or more vehicle control and maneuver actions made by a human driver of the moving vehicle that is associated with the set of real-time video images with respect to the vehicle control and maneuver environmental situation. A determination is made based on the monitoring that the human driver has performed at least one vehicle control and maneuver action associated with one or more images of the set of real-time video images. The one or more images of the set of real-time video images are annotated with a set of annotations based on the at least one vehicle control and maneuver action performed by the human driver.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
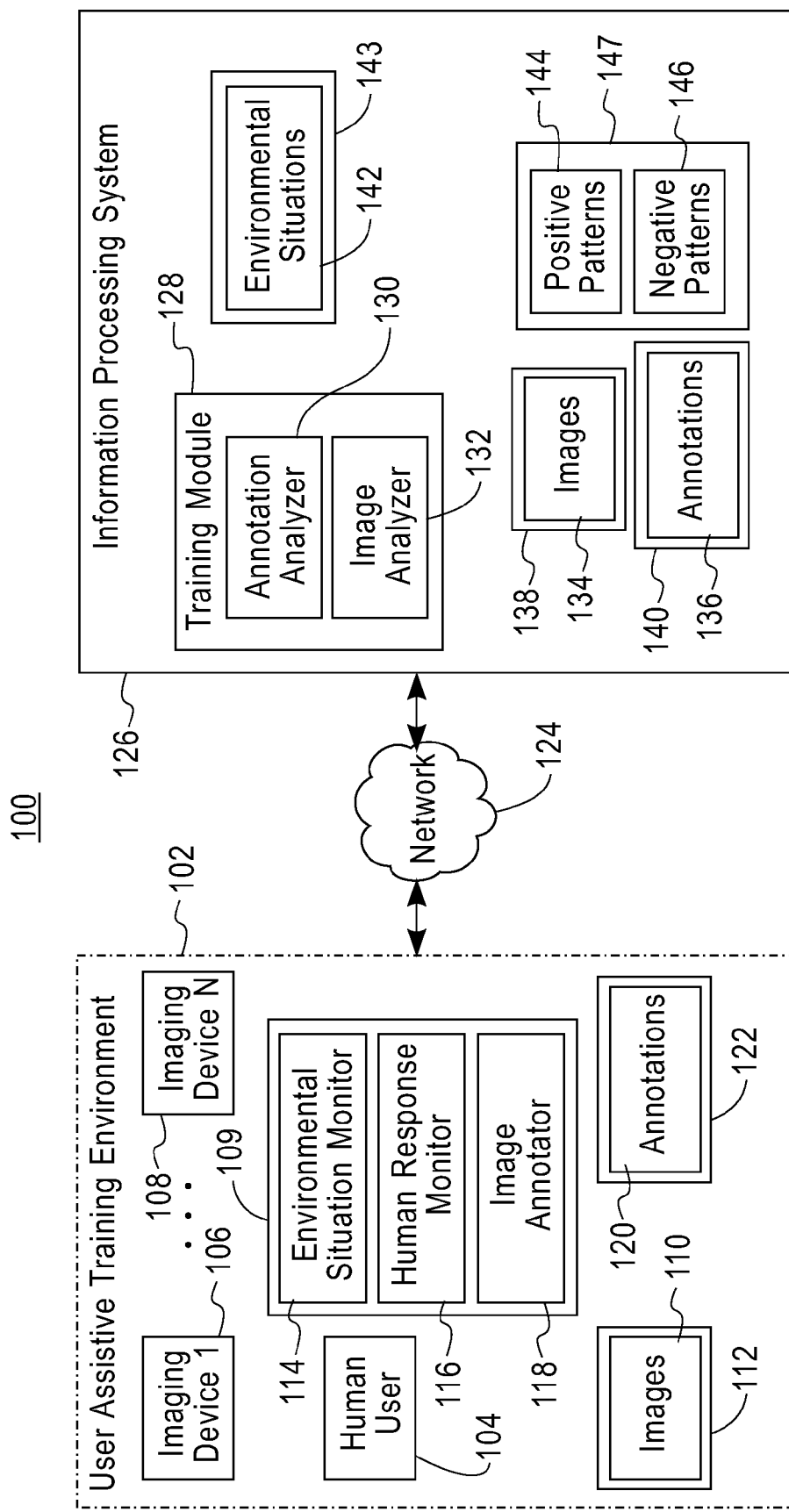
FIG. 1 is a block diagram illustrating one example of an operating environment according to one embodiment of the present invention.

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The various embodiments of the presently claimed invention are advantageous because a user's actions/response to various environmental situations can be monitored and then used to automatically suggest, prompt, and/or perform one or more actions to the user when the same or similar situation occurs again. For example, consider a human "operator", performing a task at a workstation appropriate to that task, and having visual access to the surrounding environment (i.e, being able to see it), because that is necessary in order to properly perform the task. The workstation could be either stationary, for example, an air traffic controller's station in the control tower of an airport, from which the operator can look out the window and see planes on the runways, or it can be mobile, for instance, the driver's seat of an automobile or other vehicle. The workstation has some ergonomic controls that the user can manipulate to directly or indirectly cause effects on the world. For instance, in the first case, pushbuttons on the air traffic control workstation, that could control runway traffic lights or sound alarms, or in the second case, dashboard dials and switches, steering column stalks (e.g., turn signal control, etc), foot pedals, etc, controlling behavior of the vehicle.

Additionally, the workstation has displays, such as indicator lights or readouts, but possibly also involving other sensory modalities, such as auditory or tactile, which are available to the operator as part of his input at every moment for appraising the whole real-time situation. Consider (1) that it is desired to automate some aspect of the functions that the operator is performing, (2) that the strategy for doing this involves a machine learning approach, which by definition requires examples of total states of input to the operator ("total" in the sense that all information necessary to characterize the state is collected), and of the action(s) that should be taken in response to those input states, if the aspect of the task which is to be automated is to be correctly performed.

Traditional systems generally capture the input state information only; for instance, to video-record the scene available to the operator to see. Although this video can then be broken up into training examples ("instances") for the machine learning, the examples are generally not labeled as e.g., "positive" or "negative" training instances (depending on whether the automated action is to be taken in that situation or not taken, or multiple category labeling, if there are multiple automated actions that will be trained for), but "off-line" and at a later time, the example labeling is coded in. If training instances are to be manually labeled, this can be a very laborious, expensive operation.

One or more embodiments of the present invention, on the other hand, automatically assign the training instance labeling by capturing and recording the operator's actions in response to the situations presented to him/her along with the input state information. This can be achieved quickly and inexpensively by minor modifications to the workstation and possibly its vicinity, without being invasive to the operator or the performance of the task. It should be noted that on different occasions, different persons can perform the role of operator, so that variations in response between people to the same situation can be captured in the training data. Other embodiments collect such examples that can be kept suitably organized to facilitate the machine learning training.

Operating Environment

According to one embodiment of the present invention, as shown in FIG. 1, a system 100 for training human assistive products is shown. In one embodiment, the system 100 includes one or more user assistive training environments 102. A user assistive training environment 102 is an environment that is substantially similar to an environment where a user assistive product is to be implemented. For example, user assistive products are generally implemented in vehicle, gaming environments (such as casinos, video games, etc. and their associated gaming types), or any other type of environments where a user's actions can be monitored to automatically learn, identify, and suggest appropriate actions to the user. Therefore, the user assistive training environment 102 can be a vehicle, gaming, or any other type of environment capable of implementing a user assistive product. User assistive products assist a user such as a driver of an automobile to safely control his/her speed, safely change lanes, and the like. Stated differently, a user assistive product can automatically perform one or more actions, prompts a user to perform one or more actions, and/or assists a user in performing one or more actions within the environment in which the user assistive product is implemented.

The user assistive training environment 102, in one embodiment, includes one or more human users 104. The human user 104 interacts with user assistive training environment 102. For example, if the user assistive training environment 102 is a vehicle such as an automobile the user 104 interacts with the automobile by maneuvering and controlling the automobile while encountering one or more environmental situations. It should be noted that a vehicle is any type of mechanical entity that is capable of moving under its own power, at least in principle. The vehicle is not required to be moving all the time during the training period discussed below, nor is the vehicle required to move at all.

The user may be assisted by an automaton processing the available information to decrease the monotony of annotation. For example, if it is broad daylight, an image processing gadget may recommend high beams off state based on average brightness assessment of image from the camera. The recommendation may or may not be overridden by the human annotator depending upon propriety of the recommendation.

An environmental situation, in one embodiment, is a stimulus that the user encounters that causes the user to respond (or not respond). For example, if the training environment 102 is an automobile, the user may encounter an oncoming car in the other lane or may approach another car in his/her lane. In response to encountering these situations, the user can perform one or more actions (or fails to perform an action) such as turning off a high-beam light during a night-time drive so that the visibility of an oncoming car is not hindered. The imaging devices 106, 108 record images 110 of these environmental situations and the user's response to the encountered situations, which are stored in one or more storage devices 112. The environmental situations, the users responses thereto, the imaging devices 106, 108, and the images 110 are discussed in greater detail below. It should be noted that a user can be associated with more than one image set 110.

The training environment 102 also includes an environment manager 109 that includes an environmental situation monitor 114, a human response monitor 116, and an image annotator 118. The environmental situation monitor 114 monitors the training environment via the imaging devices 106, 108 and their images 110 and detects environmental situations. The human response monitor 116 monitors and detects human user's responses to environmental situations via the imaging devices 106, 108 and their images 110; one or more switches such as a high beam switch; one or more electrical signals; and/or from the vehicles bus data such as data from a Controller Area Network.

Based on the environmental situations detected by the environmental situation monitor 114 and the user's response(s) detected by the human response monitor 116, the image annotator 118 annotates the images 110 in real-time with a set of annotations 120 that indicate how a user responded to an environmental situation. Stated differently, the images 110 are automatically and transparently annotated with the set of annotations 120 while the user is interacting with the training environment 102 as compared to the images being analyzed off-line and manually annotated by a human user. The annotations 120 can either be appended to the images 110 themselves or stored separately in a storage device 122. The environmental situation monitor 114, the human response monitor 116, image annotator 118, and the annotations 120 are discussed in greater detail below.

The system 100 also includes a network 124 that communicatively couples the training environment 102 to one or more information processing systems 126. The network 124 can comprise wired and/or wireless technologies. The information processing system 126, in one embodiment, comprises a training module 128 that utilizes images 134 and annotations 136 associated with a plurality of users to train a user assistive product. The images 134 and annotations 136 stored within storage devices 138, 140 at the information processing system 126 not only include the images 110 and annotations 120 associated with the user 104 and the training environment 102 discussed above, but also images and annotations for various other users interacting with similar training environments as well.

The training module 128 includes an annotation analyzer 130 and an image analyzer 132. The training module 128, via the annotation analyzer 130, reads and/or analyzes the annotations 136 to identify user responses to an environmental situation. The training module 128, via the image analyzer 132, analyzes the images 134 to identify an environmental situation associated with a user response. It should be noted that the training module 128 and its components 130, 132 can also reside within the environment manager 109 and vice versa.

In one embodiment, the training module 128 maintains a record 142 of each environmental situation identified in a data store 143 and identifies positive user response patterns 144 and negative user response patterns 146 for each environmental situation based on all of the responses (which can include a lack of response) that all users made when that given environmental situation was encountered. The patterns are also stored in a data store 147. The positive user response patterns 144 are used by the training module 128 to train a user assistance product/system on the actions/operations to take when user assistance product/system encounters an environmental situation. The negative user response patterns 146 can be used to further enforce the positive response patterns 144 by indicating to a user assistance product/system how not to respond to an environmental situation. It should be noted that the negative user response patterns 146 can simply be used to distinguish between desired user response patterns and non-desired user response patterns. The training module 128 and user response patterns 144, 146 are discussed in greater detail below.

It should be noted that although the information processing system 126 is shown as being separate from the user assistive training environment 102, in one embodiment, the information processing system 126 can reside within the user assistive training environment 102 as well. Also, one or more of the components shown residing within the information processing system 126 can reside within the user assistive training environment 102. For example, the training module 128 can reside within user assistive training environment where the processing by the training module 128 discussed above can be performed within the user assistive training environment 102

Automatically Annotating User Assistive Training Images in Real-Time

As discussed above, current methods of training user assistive products is very laborious and costly. These current methods for training user assistive products generally involve taking sample videos of various situations that the human user encounters while interacting with environment and the human user's response to such situations. For example, consider an automobile environment where one situation that a user encounters is one that requires the user to disable the cruise control or decrease the speed of the cruise control when the user's car is approaching another car. Therefore, videos or photos are taken of multiple human drivers in this situation (i.e., videos of the human driving with the cruise control on; the user's car approaching another car; and the user either disabling the cruise control or decreasing the car's speed). These videos are then reviewed by a human to determine what the situation is and how the user reacted. In other words, a human is required to analyze the samples to identify the positive actions (e.g., the actions that the user assistive product is to take) and the negative actions (e.g., the actions that the user assistive product is not to take) so that the user assistive product can be trained accordingly. As can be seen, this off-line process can be very time consuming when dealing with a large quantity of samples associated with multiple situations for multiple users.

The various embodiments of the present invention, on the other hand, annotate captured images 110 in real-time based on a detected user response(s) to an encountered environmental situation. The following is a more detailed discussion on automatically and transparently annotating captured images 110 in real-time for training a user assistive product/system. It should be noted that the following discussion uses an example of a vehicle as one type of user assistive training environment 102. However, this is only one type of user assistive training environment 102 applicable to the various embodiments of the present inventions.

As stated above, the human user 104 is within a training environment 102 of a vehicle such as (but not limited to) an automobile. In this embodiment, the training environment 102 is being used to train a user assistive product/system that assists a human in operating an automobile. As the user is interacting with the training environment 102 such as by operating the vehicle the user encounters various environmental situations as discussed above. For the following discussion the environmental situation is that the automobile of the user 104 is approaching a car while the automobile's high-beams are activated. It should be noted that this is only one environmental situation that is applicable to the present invention and does not limit the present invention in any way.

The imaging devices 106, 108 capture images associated with the environmental situation. For example, the imaging devices 106, 108, in one embodiment, are continuously monitoring the training environment and capturing images at a given before, during, and/or after an encountered environmental situation. In this embodiment, the environmental situation monitor 114 determines that an environmental situation is being encountered and stores the corresponding images from the imaging devices 106, 108 in the image data store 112. The environmental situation monitor 114 can determine that an environmental situation is being encountered in response to the human response monitor 116 determining that the user is responding to an environmental situation. In this embodiment, the environmental situation monitor 114 stores the images captured by the imaging devices 106, 108 at a given time prior to the user responding to the situation, during the situation, and optionally a given time after the situation has occurred.

In another embodiment, the environmental situation monitor 114 can analyze the images to determine when an environmental situation is occurring. For example, the environmental situation monitor 114 can detect a given number of red pixels, an intensity of red pixels, or the like within the images to determine that a taillight is being captured, which indicates that the user's automobile is approaching another vehicle.

As the user responds to the environmental situation by, in this example, deactivating the high-beams the human response monitor 116 detects this response and the images corresponding to this environmental situation are annotated with a set of annotations 120. The human response monitor 116 can determine that a user is responding to the environmental situation in a number of ways. For example, the human response monitor 116 can analyze the images being captured by the imaging devices 106, 108 and detect that the user is operating the high-beam switch/lever which caused the high-beams to be deactivated. In another embodiment, the human response monitor 116 can detect that a high-beam icon on the dashboard was activated and when the environmental situation occurred the icon was deactivated indicating that the high-beams were deactivated. In a further embodiment, the human response monitor 116 can communicate with sensors in the high-beam switch/lever which signal the human response monitor 116 when the high-beams are activated/deactivated. In yet another embodiment, the human response monitor 116 can monitor the voltage at the lights and detect a change in voltage or a voltage quantity that indicates when the high-beams are activated/deactivated. In yet a further embodiment, the human response monitor 116 can monitor the vehicle's bus data such as data from a Controller area network to determine when the high-beams are activated/deactivated.

As discussed above, when the environmental situation monitor 114 determines that an environmental situation is occurring the image annotator 118 annotates the set of images 110 corresponding to the environmental situation with a set of annotations 120 based on the human user 104 response to the environmental situation detected by the human response monitor 116. In addition, if the environmental situation monitor 114 determines that an environmental situation is occurring but the human response monitor 116 does not detect a human user response, the image annotator 118 can annotate the corresponding image set 110 with annotations indicating that a user response did not occur. Alternatively, if a user does not respond to an environmental situation the image set 110 corresponding to the situation can be stored without any annotations as well.

Figures 2, 3:
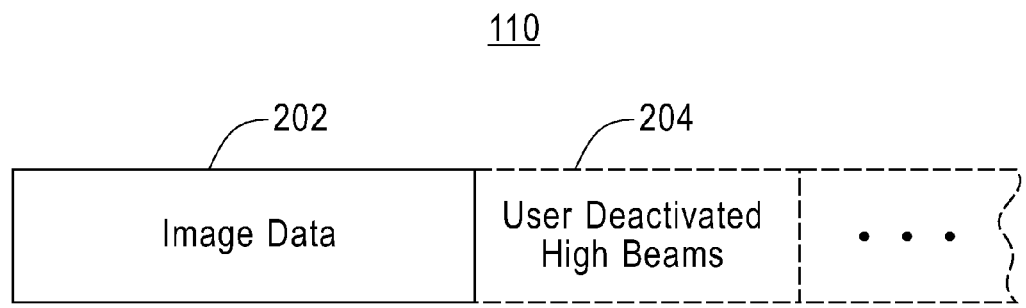
FIG. 2 shows one example of an annotated image file according to one embodiment of the present invention.
FIG. 3 shows one example of an annotation record according to one embodiment of the present invention.

In one embodiment, the image set 110 is appended with annotations associated with the user response. FIG. 2 shows one example, of an image set 110 being appended with a set of annotations 120. In particular, FIG. 2 shows an image set 110 comprising image data 202 and a set of annotations 204. The image data 202 can comprise the actual image data captured by the imaging devices 106, 108, time stamp data, headers, trailers, and the like. The annotation data 204 includes text, symbols, or the like that can be interpreted by the training module 128. In the example of FIG. 2 the annotation data 204 is text that indicates that the user deactivated high-beams. However, any annotation mechanism can be used as long as the training module 128 is able to decipher the annotations to determine how a user responded or did not respond to an environmental situation.

FIG. 3 shows an example of storing the annotations 120 separate from the image sets 110. In particular, FIG. 3 shows an annotation record 302 that comprises multiple annotation sets 304, 306, 308 each associated with a different image set 310, 312, 314. The annotation record 302 includes a first column 316 with entries 318 comprising an annotation ID that uniquely identifies each annotation set. A second column 320 includes entries 322 comprising annotation data that indicates the response taken by a user when an environmental situation was encountered or optionally whether the user failed to respond. As discussed above, even though FIG. 3 shows text in natural language being used as the annotation mechanism, any annotation mechanism can be used as long as the training module 128 is able to decipher the annotations to determine how a user responded or did not respond to an environmental situation. A third column 324 includes entries 326 comprising a unique identifier associated with the image set 310 that the annotation sets 304 correspond to. In this embodiment, the image sets are stored with a unique identifier so that they can be distinguished from other image sets and matched with their appropriate annotation set. However, any mechanism can be used such as (but not limited to) time stamps to point an annotation set to an image set and vice versa.

In another embodiment, the user assistive training environment 102 can be preprogrammed with positive patterns 144, negative patterns 146, and environmental situation data 142 from previous training experiences. In this embodiment, the environmental situation monitor 114 uses the environmental situation data 142 to detect when an environmental situation is occurring. For example, the environmental situation data 142 can include information about an environmental situation such as the driver's high-beams were activated and when the driver's car was approaching another vehicle. The environmental situation data 142 then monitor for an approaching car and activated high-beams. The environmental situation monitor 114 can detect if high beams are activated by analyzing the images captured by the imaging devices 106, 108 to determine if the high-beam lever/button/switch is in an "on" position; detect that the high-beam indicator is illuminated on the dashboard, and the like.

The environmental situation monitor 114 can determine that the driver's car is approaching another car by detecting the tail lights of the approaching car. The environmental situation monitor 114 can use positive patterns 144 and negative patterns 146 that have been preprogrammed to identify which detected images are tail lights and which situations are not tail lights. For example, positive patterns 144 can include multiple images of tail lights and data associated therewith such as the number of red pixels, etc. The negative patterns 146 can include images of stop signs, traffic lights, and the like so that the environmental situation monitor 114 can distinguish a tail light from items that are not tail lights. Alternatively, the environmental situation monitor 114 can also prompt the user to confirm that a specific environmental situation is occurring.

When the environmental situation monitor 114 determines that an environmental situation is occurring, the images 110 associated with the situation are stored as discussed above. The human response monitor 116 can then automatically perform an action or prompt the user to take an action based on the positive patterns 144 associated with the situation. For example, the positive patterns 144 can indicate that the high beams are to be deactivated. Therefore, the human response monitor 116 can either automatically deactivate the high beams or prompt the user to do so and annotate the stored image set 110 accordingly. As discussed above, the positive patterns 144 can be identified for a given environmental situation based on previous user responses to the same or similar situation or by predefined responses. For example, the human response monitor 116 can annotate the image sets 110 indicating that the user did not override an automatic action such as deactivating the high beams. Therefore, the positive patterns 144 are reinforced. However, the environmental situation monitor 114 may have incorrectly identified an environmental situation and, therefore, the user can override the automatic action. In this situation the image annotator 118 annotates the image set to indicate that the response monitor chose the incorrect action. The training module 128 uses this type of annotation as a negative pattern 146 annotation. If the human response monitor 116 prompts a user, the images are annotated in the same way.

Training Environment Data Aggregation

As discussed above, the training module 128 collects images 134 and annotations 136 from a plurality of user assistive training environments and aggregates them together. In one embodiment, each environment is substantially similar and associated with a different user. However, in another embodiment, the training module collects image sets 134 and annotations 136 associated with a plurality of different training environments. The image analyzer 132 analyzes each collected image 134 and identifies the environmental situation associated therewith using pattern recognition and any other image analysis mechanism. The training module 128 then stores environmental situation data 142 that identifies an environmental situation and the images 138 and/or annotations associated therewith. It should be noted that if only a single environmental situation was being monitored, such as detecting when the driver's car is approaching another car with the high-beam lights activated, then the training module 128 does not need to identify the environmental situation.

The annotation analyzer 130 then identifies the annotations 136 associated with the image sets 134 via the pointer within the annotations 136, as discussed above. Then for a given environmental situation the annotation analyzer 130 analyzes the annotations to identify the action taken or not taken by the human driver. For example, in the high-beam training environment example, the annotation analyzer 130 determines if the driver associated with the each image set deactivated or did not deactivate the high-beam lights when the driver's car approach another vehicle. The annotation analyzer 130 can then identify the most frequently occurring action, e.g., high-beams were deactivated, and set this action as a positive pattern 144. The least frequent occurring action, e.g., not deactivating the high-beams, can be set as a negative pattern 146. Therefore, the training module can use the positive patterns 144 to train a user assistive product to automatically deactivate the high-beams, or at least prompt the user to deactivate the high-beams when the user assistive product detects that the high-beams are on and the driver's car is approaching another car. The negative patterns 146 can be used by the training module 128 to enforce the positive patterns 144. For example, the training module 128 can train the user assistive product that failing to deactivate the high-beam when approaching another car is an action that the product is to avoid. In other words, the user assistive product is provided with a control signal for an automatic action that it is to perform.

The images 134 and annotations 136 stored within storage devices 138, 140 at the information processing system 126 include not only the images 110 and annotations 120 associated with the user 104 and the training environment 102 discussed above, but also images and annotations for various other users interacting with similar training environments as well.

In one embodiment, the training module 128 maintains a record 142 of each environmental situation identified and identifies positive user response patterns 144 and negative user response patterns 146 for each environmental situation based on all of the responses (which can include a lack of response) that all users made when that given environmental situation was encountered. The positive user response patterns 144 are used by the training module 128 to train a user assistance product/system on the actions/operations to take when user assistance product/system encounters an environmental situation. The negative user response patterns 146 can be used to further enforce the positive response patterns by indicating to a user assistance product/system how not to respond to an environmental situation. It should be noted that the negative user response patterns 146 can simply be used to distinguish between desired user response patterns and non-desired user response patterns. The training module 128 and user response patterns 144, 146 are discussed in greater detail below.

As can be seen from the above discussion, the various embodiments are able to annotate captured images in real-time based on a detected user response(s) to an encountered environmental situation. A human is not required to view multiple images and manually annotate each image, which can be very inefficient and time consuming. The various embodiments provide an automated and transparent system for annotating images that can later be analyzed to determine positive and negative patterns. These patterns are used to train a user assistive product as to how to recognize specific environmental situations and take the appropriate actions.

Operational Flow for Annotating User Assistive Training Environment Images

Figure 4:
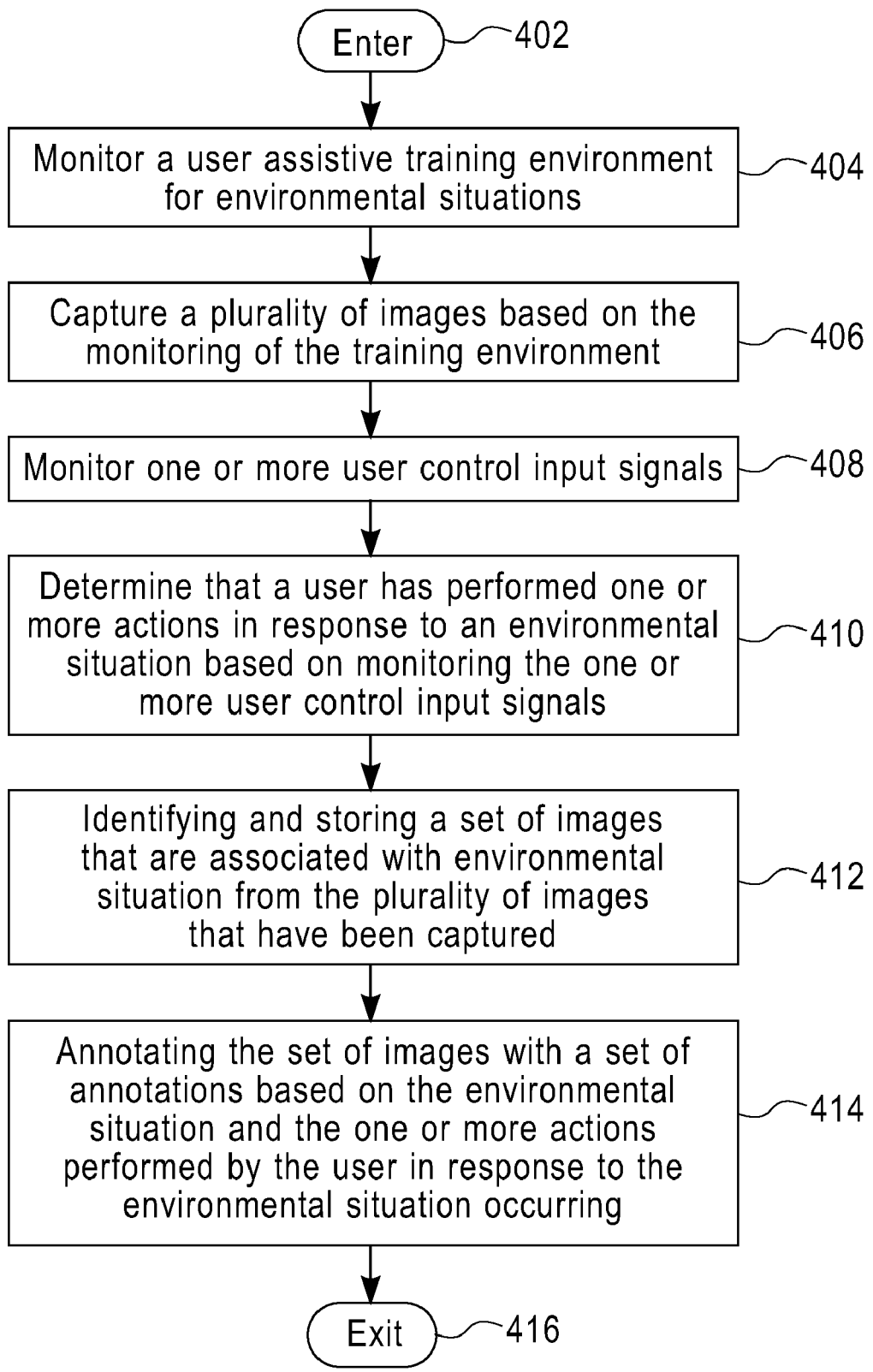
FIG. 4 is an operational flow diagram illustrating one process for annotating user assistive training environment images in real-time according to one embodiment of the present invention.

FIG. 4 is an operational flow diagram illustrating one process for annotating user assistive training environment images in real-time. The operational flow diagram of FIG. 4 begins at step 402 and flows directly into step 404. The environment manager 109, at step 404, monitors a user assistive training environment 102 for environmental situations. A set of imaging devices 106, 108 capture a plurality of images based on the monitoring of the training environment 102. The environment manager 109, at step 408, monitors one or more user control input signals. The environment manager 109, at step 410, determines that a user has performed one or more actions in response to an environmental situation having occurred based on monitoring the one or more user control input signals. The environment manager 109, at step 412, identifies and stores a set of images that are associated with environmental situation from the plurality of images that have been captured. The environment manager 109, at step 414, annotates the set of images that has been stored with a set of annotations based on the environmental situation and the one or more actions performed by the user in response to the environmental situation having occurred. The control flow then exits at step 416.

Figure 5:
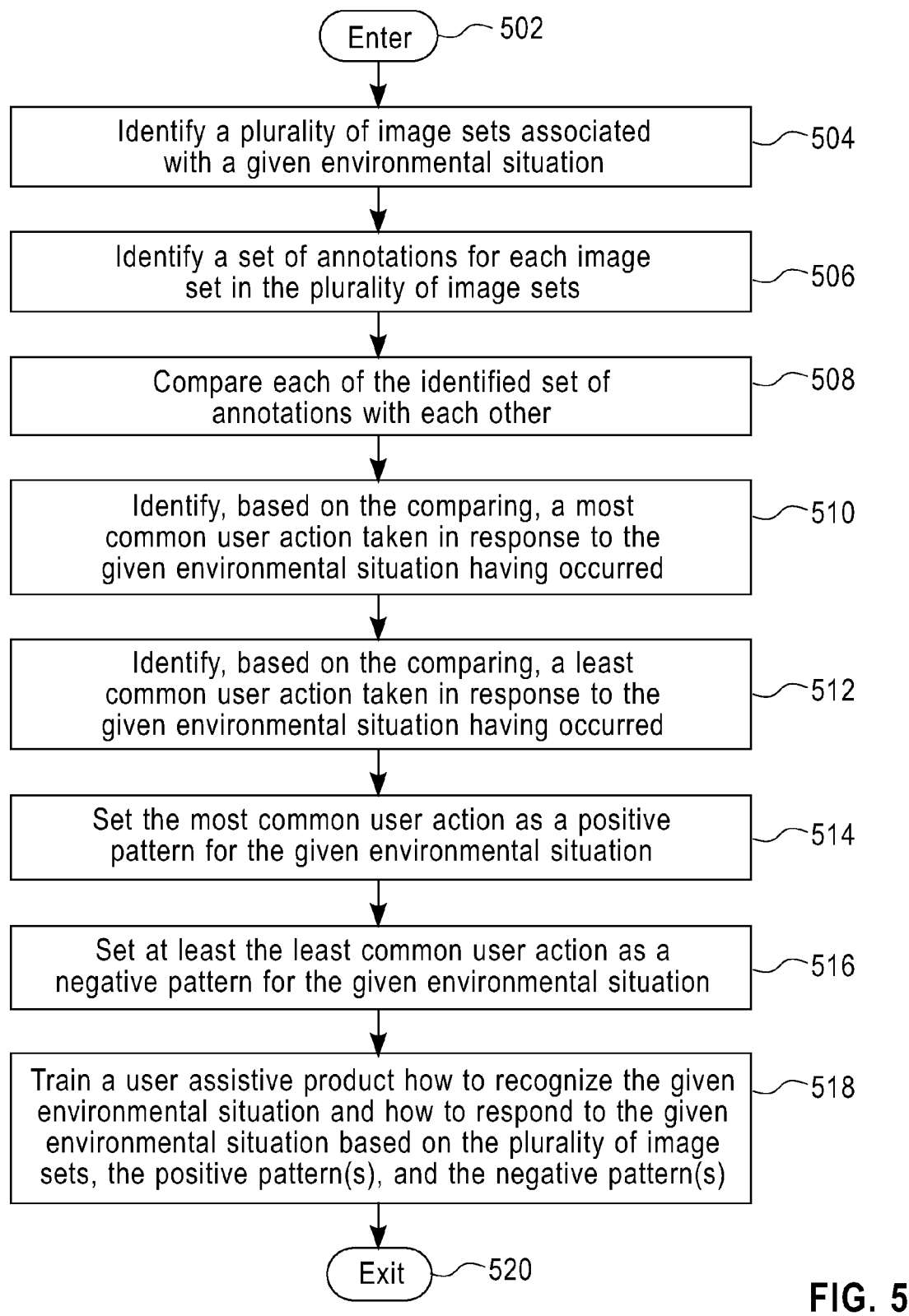
FIG. 5 is an operational flow diagram illustrating one process for analyzing annotated user assistive training environment images to determine positive and negative patterns according to one embodiment of the present invention.

Operational Flow for Analyzing Annotated User Assistive Training Environment Images FIG. 5 is an operational flow diagram illustrating one process for analyzing annotated user assistive training environment images. The operational flow diagram of FIG. 5 begins at step 502 and flows directly into step 504. The training module 128, at step 504, identifies a plurality of image sets 134 associated with a given environmental situation 142. The training module 128, at step 506, identifies a set of annotations 136 for each image set in the plurality of image sets 134. The training module 128, at step 508, compares each of the identified annotations 136 with each other.

The training module 128, at step 510, identifies, based on the comparing, a most common user action taken in response to the given environmental situation 142 having occurred. The training module 128, at step 512, identifies, based on the comparing, a least common user action taken in response to the environmental situation 142 having occurred. The training module 128, at step 514, sets the most common user action as a positive pattern 144 for the given environmental situation 142. The training module 128, at step 516, sets at least the least common user action as a negative pattern 146 for the given environmental situation 142. The training module 128, at step 518, trains a user assistive product how to recognize the given environmental situation 142 and how to respond to the given environmental situation 142 based on the plurality of image sets 134, the positive pattern(s) 144, and the negative pattern(s) 146. The control flow then exits at step 520.

Information Processing System

Figure 6:
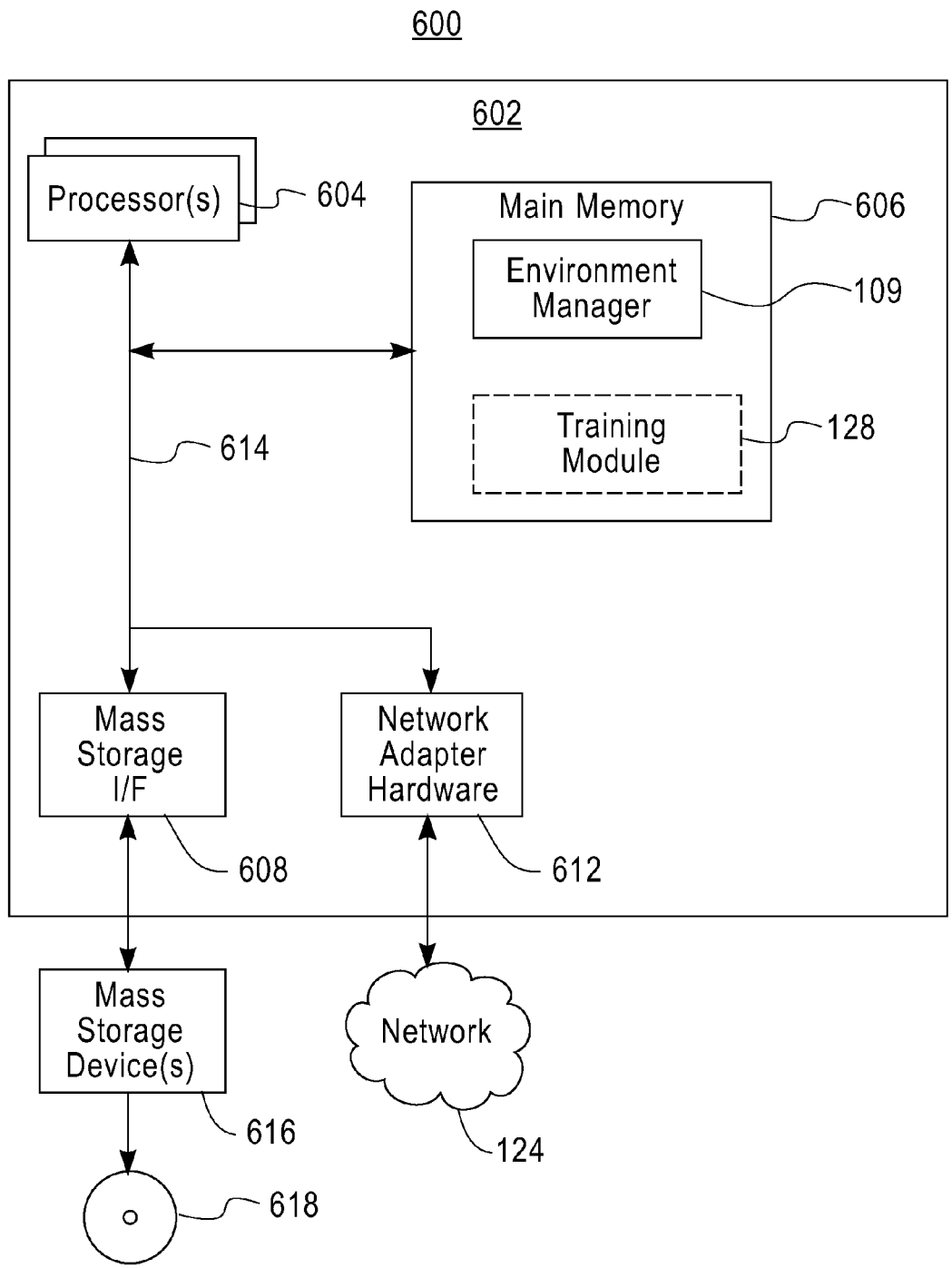
FIG. 6 is a block diagram illustrating a more detailed view of an information processing system according to one embodiment of the present invention.

FIG. 6 is a block diagram illustrating a more detailed view of an information processing system 600 that can be utilized in the user assistive training environment 102 and/or as the information processing system 126 discussed above with respect to FIG. 1. The information processing system 600 is based upon a suitably configured processing system adapted to implement the exemplary embodiment of the present invention. Similarly, any suitably configured processing system can be used as the information processing system 600 by embodiments of the present invention such as an information processing system residing in the computing environment of FIG. 1, a personal computer, workstation, or the like.

The information processing system 600 includes a computer 602. The computer 602 has a processor(s) 604 that is connected to a main memory 606, mass storage interface 608, and network adapter hardware 612. A system bus 614 interconnects these system components. The mass storage interface 608 is used to connect mass storage devices, such as data storage device 616, to the information processing system 126. One specific type of data storage device is an optical drive such as a CD/DVD drive, which may be used to store data to and read data from a computer readable medium or storage product such as (but not limited to) a CD/DVD 618. Another type of data storage device is a data storage device configured to support, for example, NTFS type file system operations.

The main memory 606, in one embodiment, comprises the environment manager 109. As discussed above, the environment manager 109 comprises the environmental situation monitor 114, the human response monitor 116, and the image annotator 118. The main memory 606 can also include the images 110 and the annotations 120 as well, but these items can also be stored in another storage mechanism. In another embodiment, the main memory can also include, either separately or in addition to the environment manager 109 and its components, the training module 128 and its components discussed above with respect to FIG. 1, the collection of images 134 and annotations 136, the positive patterns 144, and the negative patterns 146. Although illustrated as concurrently resident in the main memory 606, it is clear that respective components of the main memory 606 are not required to be completely resident in the main memory 606 at all times or even at the same time. In one embodiment, the information processing system 600 utilizes conventional virtual addressing mechanisms to allow programs to behave as if they have access to a large, single storage entity, referred to herein as a computer system memory, instead of access to multiple, smaller storage entities such as the main memory 606 and data storage device 616. Note that the term "computer system memory" is used herein to generically refer to the entire virtual memory of the information processing system 106.

Although only one CPU 604 is illustrated for computer 602, computer systems with multiple CPUs can be used equally effectively. Embodiments of the present invention further incorporate interfaces that each includes separate, fully programmed microprocessors that are used to off-load processing from the CPU 604. An operating system (not shown) included in the main memory is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 126. The network adapter hardware 612 is used to provide an interface to a network 124. Embodiments of the present invention are able to be adapted to work with any data communications connections including present day analog and/or digital techniques or via a future networking mechanism.

Although the exemplary embodiments of the present invention are described in the context of a fully functional computer system, those of ordinary skill in the art will appreciate that various embodiments are capable of being distributed as a program product via CD or DVD, e.g. CD 618, CD ROM, or other form of recordable media, or via any type of electronic transmission mechanism.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of annotating video images associated with an environmental situation based on detected actions of a human interacting with the environmental situation, the method comprising:

receiving, with an information processing system, a set of real-time video images captured by at least one video camera associated with an environment presenting one or more environmental situations to a human;

monitoring, with the information processing system, one or more user actions made by the human that is associated with the set of real-time video images with respect to the environmental situation;

determining, based on the monitoring, that the human driver has one of performed and failed to perform at least one action associated with one or more images of the set of real-time video images;

annotating, with the information processing system, the one or more images of the set of real-time video images with a set of annotations based on the at least one action that has been one of performed and failed to be performed by the human;

comparing at least two sets of annotations of the one or more images;

identifying, based on the comparing, a most common action for the environmental situation; and providing a control signal for an automatic action to be performed by a user assistive product, based on the most common action that has been identified, when the environmental situation is detected by the user assistive product.

2. The method of claim 1, further comprising:

determining an association between one or more consecutive images in the set of real-time video images associated with the at least one action that has been one of performed and failed to be performed by the human, wherein the association defines a time interval and an annotation information set associated with that time interval.

3. The method of claim 1, wherein annotating the one or more images comprises:

storing an information set associated with the one or more images in a data store, wherein the information set comprises data associated with the at least one action that has been one of performed and failed to be performed by the human.

4. The method of claim 1, further comprising:

aggregating the one or more images of the set of real-time video images with a plurality of image sets, wherein each image set in the plurality of image sets is associated with a set of real-time video images each associated with another environmental situation of the environment that is substantially similar to the environmental situation.

5. The method of claim 4, wherein each image set in the plurality of image sets is associated with a different human that has one of performed and failed to perform at least one action with respect to the another environmental situation that is substantially similar to the environmental situation.

6. The method of claim 5, wherein each image set in the plurality of image sets is annotated based on the at least action that has been one of performed and failed to be performed by the different human associated therewith.

7. The method of claim 1, wherein the environment is a moving vehicle, and wherein the environmental situation is at least one vehicle control and maneuver environmental situation of the moving vehicle.

8. An information processing system for annotating video images associated with an environment of a moving vehicle, based on detected human actions of a driver of the moving vehicle, the information processing system comprising:

a memory;

a processor communicatively coupled to the memory;

an environment manager communicatively coupled to the memory and the processor, wherein the environment manager is configured to:

receive, with an information processing system, a set of real-time video images captured by at least one video camera associated with an environment of a moving vehicle, wherein the set of real-time video images are associated specifically with at least one vehicle control and maneuver environmental situation of the moving vehicle;

monitor, with the information processing system, one or more user control input signals corresponding to one or more vehicle control and maneuver actions made by a human driver of the moving vehicle that is associated with the set of real-time video images, with respect to the vehicle control and maneuver environmental situation;

determine, based on the monitoring, that the human driver has performed at least one vehicle control and maneuver action associated with one or more images of the set of real-time video images;

annotate, with the information processing system, the one or more images of the set of real-time video images with a set of annotations based on the at least one vehicle control and maneuver action performed by the human driver;

identify, based on at least the set of annotations, a most common vehicle control and maneuver action for the vehicle control and maneuver environmental situation; and provide a control signal for an automatic action to be performed by a user assistive product, based on the most common vehicle control and maneuver action that has been identified, when the vehicle control and maneuver environmental situation is detected by the user assistive product.

9. The information processing system of claim 8, wherein the environment manager is further configured to annotate the one or more images by at least one of:

time-stamping the one or more images; and appending an information set to the one or more images, wherein the information set is associated with the at least one vehicle control and maneuver action performed by the human driver.

10. The information processing system of claim 8, wherein the environment manager is further configured to annotate the one or more images by at least:

storing an information set associated with the one or more images in a data store, wherein the information set comprises data associated with the at least one vehicle control and maneuver action performed by the human driver.

11. The information processing system of claim 8, wherein the environment manager is further configured to:

aggregate the one or more images of the set of real-time video images with a plurality of image sets, wherein each image set in the plurality of image sets is associated with a set of real-time video images each associated with another vehicle control and maneuver environmental situation of the moving vehicle that is substantially similar to the at least one vehicle control and maneuver environmental situation of the moving vehicle.

12. The information processing system of claim 11, wherein a different human driver is associated with one or more image sets in the plurality of image sets, wherein the different human driver has performed at least one vehicle control and maneuver action with respect to the another vehicle control and maneuver environmental situation that is substantially similar to the at least one vehicle control and maneuver environmental situation.

13. The information processing system of claim 12, wherein each image set in the plurality of image sets is annotated based on the at least one vehicle control and maneuver action performed by the different human driver associated therewith.

14. The information processing system of claim 8, wherein the environment manager is further configured to identify by:

comparing the set of annotations of the one or more images with at least one set of annotations associated with a set of images that have been annotated based on a different human driver that has performed at least one vehicle control and maneuver action with respect to another vehicle control and maneuver environmental situation that is substantially similar to the at least one vehicle control and maneuver environmental situation of the human driver of the moving vehicle.

15. A non-transitory computer program storage product having a computer program stored thereon for annotating video images associated with an environment of a moving vehicle, based on detected human actions of a driver of the moving vehicle, the computer program comprising instructions for:

receiving a set of real-time video images captured by at least one video camera associated with an environment of a moving vehicle, wherein the set of real-time video images are associated specifically with at least one vehicle control and maneuver environmental situation of the moving vehicle;

monitoring one or more user control input signals corresponding to one or more vehicle control and maneuver actions made by a human driver of the moving vehicle that is associated with the set of real-time video images, with respect to the vehicle control and maneuver environmental situation;

determining, based on the monitoring, that the human driver has performed at least one vehicle control and maneuver action associated with one or more images of the set of real-time video images;

annotating the one or more images of the set of real-time video images with a set of annotations based on the at least one vehicle control and maneuver action performed by the human driver;

identifying, based on at least the set of annotations, a most common vehicle control and maneuver action for the vehicle control and maneuver environmental situation; and providing a control signal for an automatic action to be performed by a user assistive product, based on the most common vehicle control and maneuver action that has been identified, when the vehicle control and maneuver environmental situation is detected by the user assistive product.

16. The non-transitory computer program storage product of claim 15, further comprising instructions for:

determining an association between one or more consecutive images in the set of real-time video images associated with the at least one action that has been one of performed and failed to be performed by the human, wherein the association defines a time interval and an annotation information set associated with that time interval.

17. The non-transitory computer program storage product of claim 15, further comprising instructions for:

aggregating the one or more images of the set of real-time video images with a plurality of image sets, wherein each image set in the plurality of image sets is associated with a set of real-time video images each associated with a vehicle control and maneuver environmental situation of the moving vehicle that is substantially similar to the at least one vehicle control and maneuver environmental situation of the moving vehicle.

18. The non-transitory computer program storage product of claim 17, wherein a different driver is associated with one or more images sets in the plurality of image sets, wherein the human driver has performed at least one vehicle control and maneuver action with respect to the vehicle control and maneuver environmental situation that is substantially similar to the at least one vehicle control and maneuver environmental situation.

* * * * *